Feb. 18, 1958   W. E. McINTYRE, JR   2,824,025
THERMOPLASTIC POLYMERIC FILMS
Filed June 6, 1956
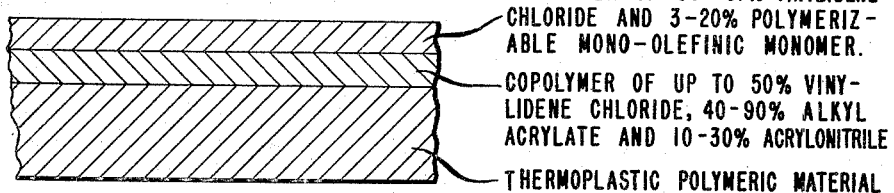
*INVENTOR*
WILLIAM ERNEST MC INTYRE, JR.
*ATTORNEY*

United States Patent Office 2,824,025
Patented Feb. 18, 1958

2,824,025

THERMOPLASTIC POLYMERIC FILMS

William Ernest McIntyre, Jr., Buffalo, N. Y., assignor to E. I. du Pont de Nemours and Company, Wilmington, Del., a corporation of Delaware Application June 6, 1956, Serial No. 589,593

16 Claims. (Cl. 117—76)

This invention relates to the manufacture of thermoplastic polymeric films such as films or polyethylene terephthalate, polyethylene, polystyrene, rubber hydrochloride and polyvinyl chloride. More particularly, it relates to the preparation of polyethylene terephthalate and polyethylene films suitable for conversion to bags, containers and similar packages.

The desired properties for transparent packaging films are well known. They include strength, heat-sealability, durability of the heat-seal as well as durability of the complete film, moistureproofness, low permeability to oxygen and carbon dioxide, high gloss, clarity, freedom from electrostatic charges and resistance to animal and vegetable fats and oils.

In the case of thermoplastic polymeric materials such as polyethylene terephthalate, strength is obtained by orienting the film in a stretching and/or rolling operation followed by heat-setting the film. Orienting, however, increases the degree of crystallinity and effects other microstructural changes which tend to impair some of the remaining properties of the film. For example, after orienting polyethylene terephthalate film, it is no longer possible to heat-seal the film with most conventional heat-sealing apparatus and obtain durable bonds. Attempting to heat-seal results in severe shrinkage with attendant puckering and weakness at the seal.

On the other hand, thermoplastic materials such as polyethylene do not require orienting to obtain strength. As unoriented films, they possess properties which contribute to their successful utilization in a wide variety of packaging applications. However, polyethylene films lack the requisites for some packaging applications particularly vacuum packaging. Limpness (lack of stiffness) and permeability to such gases as oxygen, carbon dioxide, and organic vapors preclude the use of polyethylene films for vacuum packages.

Recognizing the above major obstacles to wider commercial use of thermoplastic polymeric films such as polyethylene terephthalate and polyethylene, the industry has proposed various remedies. These remedies take the form of coatings or other treatments which tend to improve one property at the expense of another property. The use of coatings provides an additional drawback. Coatings that tend to improve the ability of polyethylene terephthalate film to form durable heat-seals and that tend to reduce the permeability without adversely affecting the durability of polyethylene film have failed to resist fats and oils. These coatings are swollen or dissolved and, in general, degraded by many types of animal or vegetable oils or fats.

A thermoplastic polymeric film possessing the optimum requirements for use in a wide variety of commercial packaging applications has remained an elusive goal.

The object of the present invention is to provide a novel thermoplastic polymeric film fulfilling the requirements of a packaging material, i. e., strength, durability, heat-sealability, moistureproofness, low permeability to gases, etc. Another object is to specify a process for preparing the novel thermoplastic polymeric films, particularly films of polyethylene terephthalate and polyethylene. Other objects will appear hereinafter.

These objects are accomplished by providing a base film of thermoplastic polymeric material having at least one surface coated with two special coatings:

(1) A subcoating comprising a copolymer obtained by polymerizing up to 50% vinylidene chloride, 40–90% of an alkyl acrylate wherein the alkyl group contains at least two carbon atoms and 10–30% acrylonitrile.

(2) A top coating comprising a copolymer obtained by polymerizing from 80–97% vinylidene chloride and 3–20% of at least one other polymerizable mono-olefinic monomer copolymerizable therewith, preferably an alkyl acrylate.

The accompanying drawing illustrates in a cross-sectional view the novel packaging film of this invention. In the drawing, the base film of thermoplastic polymeric material, the subcoating of a copolymer of alkyl acrylate, acrylonitrile and up to 50% vinylidene chloride, and the top coating of a copolymer of vinylidene chloride and a polymerizable mono-olefinic monomer are identified by legends.

Preferably, the subcoating comprises a copolymer obtained from 60–90% of an alkyl acrylate, 10–30% of acrylonitrile and 0.5–3% by weight, based upon the total weight of the previous two components, of an unsaturated aliphatic acid from the group consisting of acrylic, methacrylic, and itaconic acids, and the top coating comprises a copolymer obtained from 90–97% vinylidene chloride, 3–10% of an alkyl acrylate, and 0.5–3% by weight, based upon the total weight of the previous two components, of an unsaturated aliphatic acid from the group consisting of acrylic, methacrylic and itaconic acids.

The invention will be more clearly understood by referring to the following examples, Example 1 representing the best mode contemplated for performing the invention. These examples, although illustrating specific embodiments of the present invention, should not be considered limitative.

In the examples, the components used for preparing the copolymers are given in weight percentages. The percentages of itaconic acid are based on the total weight of the major components. Thus, a copolymer from 85% n-butyl acrylate, 15% acrylonitrile and 1% itaconic acid may be prepared from 85 pounds of n-butyl acrylate, 15 pounds of acrylonitrile and 1 pound of itaconic acid.

For convenience, abbreviations have been used in the tables. $VCl_2$ represents vinylidene chloride; 2-EHA, 2-ethylhexyl acrylate; IA, itaconic acid; BA, n-butyl acrylate; MA, methyl acrylate; AN, acrylonitrile.

EXAMPLES 1–3

The films were prepared in the following manner. A base film of polyethylene terephthalate, 0.5 mil thick, stretched 3 times its original dimensions in two directions and heat-set at about 200° C. while under tension, was coated with the two special coatings. For Example 1, the subcoating contained a copolymer of 80% 2-ethylhexyl acrylate, 20% acrylonitrile and 1%, based on the total weight of the previous components, of itaconic acid and was prepared from the following charge:

| | Lbs. |
|---|---|
| Water | 120 |
| "Duponol" ME | 2 |
| 2-ethylhexyl acrylate | 80 |
| Acrylonitrile | 20 |
| Itaconic acid | 1 |

"Duponol" ME,[1] 2-ethylhexyl acrylate, acrylonitrile,

[1] A solid sodium salt of a fatty alcohol sulfate.

itaconic acid and water were added to a vessel fitted with a stirrer and reflux condenser. A stream of nitrogen was bubbled through the mixture for 10 minutes, and then the reaction vessel was sealed and the contents stirred and heated to 50° C. Ammonium persulfate and sodium meta-bisulfite were added in four separate portions in the following amounts, with each portion being added after cessation of reaction from the previous addition:

First addition:
    18 gms. ammonium persulfate (0.04%)
    9 gms. sodium meta-bisulfite (0.02%)
Second addition:
    13 gms. ammonium persulfate (0.03%)
    6.5 gms. sodium meta-bisulfite (0.015%)
Third addition:
    13 gms. ammonium persulfate (0.03%)
    6.5 gms. sodium meta-bisulfite (0.015%)
Fourth addition:
    45 gms. ammonium persulfate (0.1%)
    23 gms. sodium meta-bisulfite (0.05%)

The ammonium persulfate and sodium meta-bisulfite were added in this step-wise manner to provide easier temperature control during the exothermic reaction. Heating and stirring were continued for 1 hour after the final addition of the above materials, and then a solution of two pounds of "Sulframin" AB [2] in 10 pounds of water was added as a sizing and stabilizing agent. The dispersion was cooled to 30° C. and discharged through a filter. The polymer dispersion contained 42% solids, and had a viscosity at 25° C. of 30 centipoises. A 0.125% solution in dimethyl formamide of the coagulated and washed polymer had an inherent viscosity of 0.9 at 125° C.

The subcoatings for Examples 2 and 3 were prepared in substantially the same manner, the only difference lying in the components for the copolymers. The copolymers' compositions are given in the table.

The topcoating for all three examples contained a copolymer of 94% vinylidene chloride, 6% methyl acrylate and 2%, based on the total weight of the previous two components, of itaconic acid and was prepared from the following charge:

| | |
|---|---|
| Water | 2.2 lbs. |
| "Duponol" ME | 180 lbs. |
| Ammonium persulfate | 75 gms. |
| Vinylidene chloride | 103.4 lbs. |
| Methyl acrylate | 6.6 lbs. |
| Itaconic acid | 2.2 lbs. |
| Meta-sodium bisulfite | 38 gms. in 1.5 lbs. water. |

"Duponol" ME, ammonium persulfate, itaconic acid and water were added to a vessel fitted with a stirrer and a reflux condenser. After dissolving these components by stirring, vinylidene chloride and methyl acrylate were introduced and the mixture refluxed at 32° C. A solution of meta-sodium bisulfite was added and the mixture stirred until refluxing ceased, thereby indicating completion of polymerization. Two pounds of "Duponol" ME in ten pounds of water were added subsequent to polymerization to stabilize the copolymer against coagulation.

The polyethylene terephthalate base films were subcoated on both sides by passing them through baths of the first dispersion. Contact time was sufficient to allow the base films to retain a slight excess of subcoating. The excess was removed by doctoring as the coating was made smooth and brought to the desired thickness. The single-coated films were then dried in an atmosphere maintained at a temperature between 120° and 130° C. (It is important that the subcoating is fully coalesced and subsequently dried before the topcoating is applied.) Then the aqueous dispersion of the topcoating was applied on both sides, smoothed and dried in a similar manner. The total coating weight of each of the coated films was 16 grams/square meter; 8 grams/square meter of the subcoating and 8 grams/square meter of the topcoating. The thickness of the films was about 1 mil.

The resulting films retained their strength, high gloss and clarity. In the following table, the properties of the resulting films are compared to three controls: an uncoated, heat-set and oriented polyethylene terephthalate base film, a single-coated film made up of the same polyethylene terephthalate base film having a coating composition identical to the top coating of the double-coated films of this invention, and a double-coated film subcoated with a 50/50/1 vinylidene chloride/2-ethylhexyl acrylate/itaconic acid copolymer which is outside the limits of the present invention and a top coating identical to the top coating of the double-coated films of the invention.

The details of the methods for testing the films follow:

Coating weight is determined by immersing a portion of the film in cyclohexanone at room temperature for 15 minutes or longer if necessary to dissolve the coating entirely; rinsing in ethyl acetate; and drying overnight at room temperature and 35% relative humidity. The sample is weighed before and after this treatment to determine the coating weight.

Moisture permeability is determined by placing the test film over the top of an aluminum cup containing 15 milliliters of water, the test area being 33.3 square centimeters. The assembly is weighed accurately and then placed in a dry (less than 3% relative humidity) air-swept oven at 39.5° C. for 24 hours. The assembly is removed from the oven, cooled to room temperature and reweighed. The weight loss is converted to grams of water lost/100 square meters/hour.

Heat-seal strength is measured by cutting a piece of the coated film 4" x 10" with the grain running in the long direction into two pieces 4" x 5". The two pieces are superimposed so that opposite surfaces are in contact. The two pieces of superimposed film are then sealed together at each end at right angles to the grain. For polyethylene terephthalate, a ¾" wide sealing bar heated to a temperature of 160° C. at 20 p. s. i. pressure contacts the ends for two seconds. (For polyethylene film, the sealing bar is ⅛" wide, at a temperature of 210–230° C. at 10 p. s. i. and a 0.15 second contact time is used.) The sealed sheets are then cut in half at right angles to the grain. From the center of the four resulting pieces, 1½" wide strips parallel to the grain are cut. The four sets of strips are then conditioned for one day at 75° F. and 35% relative humidity. They are tested by opening each set of strips at the free ends, placing them in a Suter testing machine and pulling them apart. The highest force in grams required to pull the strips apart is taken as a measure of the heat-seal bond strength.

Heat-seal durability is measured by an accelerated durability test, the "Rice Bag Drop" test. The rice bags are made by folding a 4" x 15" sheet of the coated film and sealing the film along the two long edges with the bar type heat sealer described previously. After 100 grams of rice are put into the bag, the open end is sealed with the same type of heat sealer. This leaves a small but uniform amount of free space above the rice. The bags represent envelopes of outside dimensions 4" x 6½" and inside dimensions 3" x 5". The bags are conditioned overnight at 75° F. and 35% relative humidity or 5° F. and 35% relative humidity as indicated in the tables. The test consists of releasing the bag from a fixed clamp which is 2 feet above the floor of a porcelain tray. The bags are held by the end seal and allowed to drop onto the non-sealed bottom edge. The number of falls survived before loss of rice occurs from any type of failure, is taken as a measure of durability. The type of failure is indicated by letter; P indicating failure by peeling of the seal, T indicating failure by tearing of the film in the sealed area. Thus, 14 $P_9T_1$ means that 10 bags were ---
[2] Sodium salt of an alkyl benzene sulfonate.

tested and survived an average of 14 falls. Nine bags failed by peeling of the seal; one bag failed by tearing of the film in the sealed area.

Film durability is evaluated for coated polyethylene film instead of heat-seal durability. The application of polymeric coatings to polyethylene film tends to degrade film durability. On the other hand, the durability of polyethylene terephthalate film is not materially affected by polymeric coatings. The accelerated film durability rating is obtained by folding over a 5" x 12" piece of film and sealing it along two sides with a ¾" strip of a pressure sensitive cellophane tape. This provides a 5" x 6" envelope which is then filled with 400 grams of rice. The envelope is then sealed at the top with the pressure-sensitive tape, leaving a small but uniform amount of free space above the rice. Normally, the longest dimension of the piece of 5" x 12" film runs in the direction in which the film has been extruded. In testing the bag, this length-wise direction of the film is perpendicular to the plane upon which the bag is dropped. The test consists of dropping the bag onto a stone-topped laboratory desk from a fixed height of 18 inches above the desk, i. e., 18 inches from the bottom of the bag to the desk top. The bags are allowed to drop onto the non-sealed (bottom) edge of the bag. The number of falls or drops survived before loss of rice from film failure is recorded; and tests in which loss of rice resulted from failure of the pressure-sensitive tape are invalidated. Generally, five bags are tested for each film candidate, and the average taken.

Oil-resistance was measured by immersing the coated film in refined corn oil at room temperature. The formation of blisters indicates degradation of the subcoating by contact with oil; the oil passing into the subcoating by diffusion through the top coating. The polyethylene terephthalate film itself is highly impermeable to the passage of oil.

Table I.—Properties of double-coated polyethylene terephthalate film coated on two sides

| Examples | Subcoating Composition | Heat-Seal Strength (grams/inch) | (Heat-Seal) Durability (Falls Survived) | | | Moisture Permeability (gms./100 m.²/hr.) | Oil Resistance |
| --- | --- | --- | --- | --- | --- | --- | --- |
| | | | 75° F. | 32° F. | 0° F. | | |
| Control | (Uncoated) | 0 | 0 | | | 250 | No effect in 20 days. |
| Do | (Top coating only) | 200 | 0-2 | | | 35 | Do. |
| Do | 50/50/1—VCl₂/2-EHA/IA | 435 | 8P5 | 7P5 | 7P5 | 30 | Blistered in 4 days. |
| 1 | 80/20/1—2-EHA/AN/IA | 454 | 11P5 | 8P5 | 7P5 | 27 | No effect in 20 days. |
| 2 | 85/15/1—BA/AN/IA | 328 | 15P5 | 12P5 | 9P5 | 29 | Do. |
| 3 | 40/50/10/1—VCl₂/2-EHA/AN/IA | 529 | 7P5 | 6P5 | 1T5 | 30 | Do. |

EXAMPLES 4–5

The films were prepared essentially in the manner described for Examples 1–3. The oriented and heat-set polyethylene terephthalate base film was unwound from a roll, passed over a tensioning roll and under a guide roll into a tank containing the subcoating composition. The film, coated on both sides, was then passed between two "doctor" rolls to smooth the coating and to regulate its thickness. The coated film was dried in a tower maintained at 120° C.–130° C. The second or top coating, identical to that used in Examples 1–3, was then applied similarly to provide films having a total coating weight of 8 grams/square meter; 4 grams/square meter of subcoat and 4 grams/square meter of top coat, instead of a total coating weight of 16 grams/square meter. The coating compositions were prepared substantially as described for Examples 1–3. The results, compared to a double-coated film whose subcoating composition was outside the limits of the present invention, are presented in the following table.

Table II.—Properties of double-coated polyethylene terephthalate film coated on two sides

| Examples | Subcoating Composition | Heat-Seal Strength (grams/inch) | (Heat-Seal) Durability (Falls Survived) | | | Moisture Permeability (gms./100 m.²/hr.) | Oil Resistance |
| --- | --- | --- | --- | --- | --- | --- | --- |
| | | | 75° F. | 32° F. | 0° F. | | |
| Control | 50/50/1—VCl₂/2-EHA/IA | 265 | 5P5 | 4P5 | 4P5 | 63 | Blistered in 4 days. |
| 4 | 80/20/1—2-EHA/AN/IA | 254 | 7P5 | 7P5 | 8P5 | 59 | No effect in 20 days. |
| 5 | 85/15/1—BA/AN/IA | 210 | 12P5 | 8P5 | 6P5 | 65 | Do. |

EXAMPLES 6–8

Examples 1–3 were re-run except that the coatings were only applied to one side of the polyethylene terephthalate base film. The total coating weight was the same as in Examples 1–3: 8 grams/square meter of subcoating and 8 grams/square meter of top coating. The results are summarized in the following table.

Table III.—Properties of double-coated polyethylene terephthalate film coated on one side

| Examples | Subcoating Composition | Heat-Seal Strength (grams/inch) | (Heat-Seal) Durability (Falls Survived) | | | Moisture Permeability (gms./100 m.²/hr.) | Oil Resistance |
| --- | --- | --- | --- | --- | --- | --- | --- |
| | | | 75° F. | 32° F. | 0° F. | | |
| 6 | 80/20/1—2-EHA/AN/IA | 631 | 14P5 | 9P5 | 8P5 | 31 | No effect in 20 days. |
| 7 | 85/15/1—BA/AN/IA | 540 | 20P5 | 9P5 | 8P5 | 31 | Do. |
| 8 | 40/50/10/1—VCl₂/2-EHA/AN/IA | 950 | 12P5 | 10P5 | 5T5 | 29 | Do. |

An additional test was run with the double-coated film of Example 7, i. e., polyethylene terephthalate film coated with the subcoating composition containing a copolymer obtained from n-butyl acrylate/acrylonitrile/itaconic acid (85/15/1) and the top coating composition containing a copolymer obtained from vinylidene chloride/methyl acrylate/itaconic acid (94/6/1). A small fin-sealed pouch capable of holding slightly more than 20 cc. of liquid was fabricated. The coatings were on the inside of the pouch. The pouch was sealed on three sides, filled with 20 cc. of a meat oil, and sealed. To a similar pouch was added about 20 cc. of a motor oil, and the pouch was sealed. The seals were made at a temperature of about 218° C. making a seal of about ½" in width under conditions of about 10 lbs./sq. in. and 2 seconds dwell time. After storing these pouches in an oven at about 72° C., for 72 days, there was substantially no change in the heat-seal strength of the heat-seal bonds of the pouches. This indicates that the seals were not affected by contact with these oils, and consequently the oils had no effect upon the subcoating.

EXAMPLES 9–10

Examples 4–5 were re-run except that the coatings were only applied to one side of the polyethylene terephthalate base film. The total coating weight was the same as in Examples 4–5: 4 grams/square meter of subcoating and 4 grams/square meter of top coating. The results are summarized in the following table.

acrylate and top coated with a vinylidene chloride copolymer top coating of the same composition as described above were used.

A number of pouches, approximately 3 inches x 5 inches and capable of holding about 25 cubic centimeters of liquid, were fabricated from each of the double-coated films and from the uncoated polyethylene film. These pouches were fabricated so that the coating was on the outside. They were tested by filling with different types of oils; namely, olive oil and a cooking oil which was a hydrogenated cottonseed oil. After filling, the pouches were heat-sealed at 185° C. using a one-second dwell and a pressure of 10 lbs./sq. inch to provide a seal width of ½ inch. The pouches were all placed on filter paper and stored for 10 days at room temperature.

After four days, the filter paper underneath the pouches fabricated from the uncoated polyethylene film was damp, indicating penetration of the oil through the polyethylene film. No penetration of oil was noted in the other pouches fabricated from the double-coated films. However, the coating on the double-coated control film was marked with white streaks in a mottled pattern, indicating the degradative effect of the oil upon the subcoating of the double-coated control film. The coatings of the double-coated film of this example were entirely clear and unaffected.

The double-coated film of this example was also tested in a commercial operation. Pouches, about 5½ inches x 7 inches, were fabricated and filled with about 6 ounces Table IV.—Properties of double-coated polyethylene terephthalate film coated on one side

| Examples | Subcoating Composition | Heat-Seal Strength (grams/inch) | (Heat-Seal) Durability (Falls Survived) | | | Moisture Permeability (gms./100 m.²/hr.) | Oil Resistance |
| --- | --- | --- | --- | --- | --- | --- | --- |
| | | | 75° F. | 32° F. | 0° F. | | |
| 9 | 80/20/1—2-EHA/AN/IA | 450 | 11P5 | 8P5 | 8P5 | 42 | No effect in 20 days. |
| 10 | 85/15/1—BA/AN/IA | 325 | 15P5 | 11P5 | 8P5 | 45 | Do. |

EXAMPLE 11

Polyethylene film was double-coated on one side in the manner described for Examples 1–3. The subcoating copolymer was obtained from 40% vinylidene chloride/50% 2-ethylhexyl acrylate and 10% acrylonitrile with 1% of itaconic acid based upon the weight of the previous components. The top coating copolymer was obtained from 94% vinylidene chloride, 6% methyl acrylate, and 2% itaconic acid, based upon the weight of the previous two components. The coatings were prepared as described for the previous examples, and they were applied from aqueous dispersions containing about 40% solids. Each coating was dried in a radiant heated dryer. The subcoating thickness was 2.6 grams/square meter, and the top coating thickness was 4.7 grams/square meter.

The only difference from the examples pertaining to polyethylene terephthalate was the following. Before applying the coating compositions to the polyethylene film, the base film was pretreated to improve adhesion of the coating compositions thereto. The treatment, as disclosed in copending application U. S. Serial No. 323,271, filed November 29, 1952, to L. E. Wolinski, comprises exposing the partially-formed film to ozone at a temperature above 150° C. immediately after extrusion of the film. It is believed that this treatment roughens the surface of the film. When applying the coating compositions to polyethylene film, care must be taken to avoid stretching or elongating the film.

As controls, an uncoated polyethylene film and a polyethylene film subcoated with a copolymer obtained from 70% vinylidene chloride and 30% 2-ethylhexyl of a luncheon meat. Air was evacuated from the pouch and the pouch was sealed. These pouches were packed into a box containing about 16–20 pouches. The boxes were then subjected to rather severe shipping tests over a period of at least one week wherein the boxes received considerable handling. In the shipping tests, less than 4% of the packages failed (lost vacuum) out of more than 100 packages shipped. As is well known, the relatively high oxygen permeability of uncoated polyethylene film makes it unsatisfactory as a vacuum packaging material.

EXAMPLES 12–13

Polyethylene films were prepared and coated in the manner described for Example 11. The top coating in both examples was a copolymer obtained from a 94/6/2 vinylidene chloride/methyl acrylate/itaconic acid. The subcoatings, as well as the coating weights of both coatings, are given in the following table.

Table V

| Examples | Subcoating Composition | Coating Weight (g./m.²) | |
| --- | --- | --- | --- |
| | | Subcoating | Top Coating |
| 12 | 80/20/1—2-EHA/AN/IA | 5.8 | 5.6 |
| 13 | 85/15/1—BA/AN/IA | 4.6 | 8.9 |

The double-coated films were fabricated into pouches and tested. Pouches from both of these films were unaffected by olive oil and cooking oil after 10 days at room temperature and no oil penetrated. Luncheon meats packaged in pouches of the above films were shipped in the manner described for Example 11. The packages showed less than 1% failures out of more than 100 pouches fabricated from each of the double-coated films.

While the examples refer to coating polyethylene terephthalate and polyethylene films, the invention is applicable to thermoplastic polymeric films in general. The invention is applicable to these films whether the films are stretched and heat-set, stretched only or neither stretched nor heat-set.

A particularly useful application of the invention is found in using polyethylene terephthalate which has been stretched and/or rolled but not heat-set. This twice-coated polyethylene terephthalate film stretched three times its original dimensions in two directions, is outstanding as a heat-shrinkable tight wrapping for such articles as frozen poultry, ham, smoked meats, etc. The coated heat-shrinkable film is normally formed into a bag open at one end; the article of food is placed into the bag; and the bag is sealed. Air may be evacuated from the bag before sealing if desired. The bag containing the article of food is then immersed in a hot liquid, e. g., water at 70°–100° C., to shrink the bag around the article.

The coatings may also be applied to unstretched films which may then be stretched in one or two directions (as described in U. S. Patent 2,627,088 to Alles and Saner). This procedure also produces a coated, heat-shrinkable wrapping film which may be used directly in sheet form or fabricated into bags.

The important concept leading to the wrapping materials described in the examples and the materials described in the preceding paragraphs resides in the use of a base film of thermoplastic polymeric material coated with two critical coatings; namely, a subcoating comprising a copolymer obtained from up to 50% by weight of vinylidene chloride, 40–90% by weight of an alkyl acrylate, wherein the alkyl group contains at least 2 carbon atoms, preferably at least 4 carbon atoms and 10–30% acrylonitrile, and a top coating comprising a copolymer obtained from 80–97% vinylidene chloride and 3–20% of at least one other polymerizable mono-olefinic monomer copolymerizable with vinylidene chloride.

The alkyl acrylate in the subcoating contributes to the elasticity of the subcoating. The amount of this component necessary to provide a packaging material of satisfactory strength and durability is dependent upon the particular alkyl acrylate used. Acrylonitrile in the subcoating contributes to the resistance of the copolymer to degradation by animal and vegetable oils and fats. Without acrylonitrile, the subcoating composition is either swollen or dissolved by many types of animal or vegetable oils or fats. The combination of these components in the copolymer of the subcoating has another inherent property which it contributes to the double-coated film. It imparts to the film the ability to be resealed by the simple application of finger pressure at room temperature after the original heat-seal has been ruptured.

The moisture impermeability of the film of this invention is contributed by the top coating composition. A relatively hard polymer prepared from at least 80% vinylidene chloride and 3–20% of at least one other polymerizable mono-olefinic monomer is necessary. Such polymers are not easily affected by animal or vegetable oils. As polymerizable monomers for use with the vinylidene chloride in the top coating, I have illustrated the use of methyl acrylate. However, the invention is not so limited. Other polymerizable monomers may also be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methyl-propyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U. S. Patent 2,160,943. These compounds may be described as vinyl or vinylidene compounds having a single

group. The most useful ones fall within the general formula

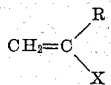

where R may be hydrogen, a halogen or a saturated aliphatic radical and X is selected from one of the following groups:

$$-Cl, -Br, -F, -CN, -C_6H_5, -COOH$$

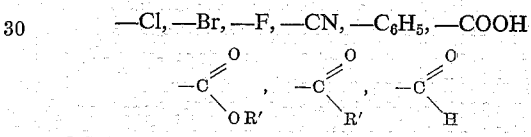

$-OC_6H_5$, $-CONH_2$, $-CONH-R'$, and $-CONR'_2$, in which R' is alkyl.

The coatings may be applied from aqueous or organic vehicles, i. e., in the form of aqueous dispersions or from solutions of the polymers in organic solvents. For optimum properties, unsaturated aliphatic acids such as itaconic acid, acrylic acid and methacrylic acid may be incorporated in the top coating compositions. While the examples illustrate the use of itaconic acid in the top coating compositions, substantially equivalent quantities of either acrylic acid or methacrylic acid used in place of itaconic acid produce similar results. When the top coating compositions are applied from organic solutions, the acid may be omitted with little deleterious effect. When coating from aqueous dispersions, the acid may also be omitted if steps are taken to facilitate wetting the film by using commercial wetting agents or other methods. It should be pointed out that films top coated with compositions that do not include the unsaturated aliphatic acids are somewhat inferior in the degree of transparency. For this reason, it is preferred to include one of the above unsaturated aliphatic acids in the top coating compositions.

The coatings may be applied in accordance with any known coating techniques. They may be applied by passing the film through baths in a continuous manner or in a batch manner. Coatings may also be sprayed on the film, or applied manually by brushing or the like. The thickness of the coatings may be adjusted in accordance with methods well known in the coating art. Selection of the paper thicknesses of the top coating and the subcoating depends to some extent on the properties that one desires to emphasize. Thus, the thickness of the subcoating influences the strength and durability of the heat-seal and the durability of the film in general. The thickness of the top coating influences the permeability of the film to moisture and gases.

The double-coated films of this invention are useful as packaging materials for foods, cigarettes and the like. Their durability and their impermeability to gases and water vapor combine to provide wrapping materials that can withstand the abuse of handling and shipping and wherein the freshness of the products may be retained over long periods. A particularly useful application of the improved double-coated polyethylene terephthalate film is in refrigerating units. Polyethylene terephthalate film, being impervious to halogen-substituted hydrocarbon gases such as dichlorodifluoromethane, can be used in the units wherever insulation from these gases is necessary.

While the invention contemplates the use of the copolymers as the essential constituents of the coatings, other ingredients may be added. The addition of pigments, dyes, delustrants, plasticizers, etc., is therefore understood to be within the purview of this invention.

As many widely different embodiments may be made without departing from the spirit and scope of this invention, it is understood that the invention is not limited except as defined in the appended claims.

What is claimed is:

1. A base film of thermoplastic polymeric material having at least one surface coated with a subcoating comprising a copolymer obtained from up to 50% vinylidene chloride, 40–90% alkyl acrylate wherein the alkyl group contains at least two carbon atoms and 10–30% acrylonitrile and a top coating comprising a copolymer obtained from 80–97% vinylidene chloride and 3–20% of at least one other polymerizable mono-olefinic monomer copolymerizable therewith.

2. A base film of thermoplastic polymeric material having at least one surface coated with a subcoating comprising a copolymer obtained from 60–90% alkyl acrylate wherein the alkyl group contains at least two carbon atoms, 10–30% acrylonitrile and 0.5–3%, based on the total weight of the previous components, of an unsaturated aliphatic acid from the group consisting of acrylic acid, methacrylic acid and itaconic acid and a top coating comprising a copolymer obtained from 90–97% vinylidene chloride, 3–10% alkyl acrylate and 0.5–3%, based on the total weight of the previous components, of an unsaturated aliphatic acid from the group consisting of acrylic acid, methacrylic acid and itaconic acid.

3. A base film of polyethylene terephthalate having at least one surface coated with a subcoating comprising a copolymer obtained from up to 50% vinylidene chloride, 40–90% alkyl acrylate wherein the alkyl group contains at least two carbon atoms, 10–30% acrylonitrile and 0.5–3%, based on the total weight of the previous components, of an unsaturated aliphatic acid from the group consisting of acrylic acid, methacrylic acid and itaconic acid and a top coating comprising a copolymer obtained from 80–97% vinylidene chloride, 3–20% alkyl acrylate and 0.5–3%, based on the total weight of the previous components, of an unsaturated aliphatic acid from the group consisting of acrylic acid, methacrylic acid and itaconic acid.

4. A base film of polyethylene having at least one surface coated with a subcoating comprising a copolymer obtained from up to 50% vinylidene chloride, 40–90% alkyl acrylate wherein the alkyl group contains at least two carbon atoms, 10–30% acrylonitrile and 0.5–3%, based on the total weight of the previous components, of an unsaturated aliphatic acid from the group consisting of acrylic acid, methacrylic acid and itaconic acid and a top coating comprising a copolymer obtained from 80–97% vinylidene chloride, 3–20% alkyl acrylate and 0.5–3%, based on the total weight of the previous components, of an unsaturated aliphatic acid from the group consisting of acrylic acid, methacrylic acid and itaconic acid.

5. A film as in claim 1 wherein the monoolefinic monomer copolymerizable with vinylidene chloride in the top coating is methyl acrylate.

6. A film as in claim 1 wherein the alkyl acrylate in the subcoating is 2-ethylhexyl acrylate.

7. A film as in claim 1 wherein the alkyl acrylate in the subcoating is n-butyl acrylate.

8. A film as in claim 3 wherein the unsaturated aliphatic acid in the coatings is itaconic acid.

9. A process for preparing a packaging film which comprises coating a base film of thermoplastic polymeric material with a copolymer obtained from up to 50% vinylidene chloride, 40–90% alkyl acrylate wherein the alkyl group contains at least two carbon atoms, 10–30% acrylonitrile and 0.5–3%, based on the total weight of the previous components, of itaconic acid; drying the coated base film; applying to the dried coated film a second coating comprising a copolymer obtained from 80–97% vinylidene chloride, 3–20% alkyl acrylate and 0.5–3%, based on the total weight of the previous components, of itaconic acid; and drying the twice-coated film.

10. A process for preparing a packaging film which comprises coating oriented polyethylene terephthalate film with a copolymer obtained from 60–90% of an alkyl acrylate, 10–30% of acrylonitrile and 0.5–3%, based on the weight of the previous two components, of itaconic acid; drying the coated film; applying to the dried coated film a second coating comprising a copolymer obtained from 90–97% vinylidene chloride, 3–10% methyl acrylate and 1%, based on the weight of vinylidene chloride and methyl acrylate, of itaconic acid; and drying the twice-coated film.

11. A process for preparing a packaging film which comprises coating polyethylene film with a copolymer obtained from 60–90% of an alkyl acrylate, 10–30% of acrylonitrile and 0.5–3%, based on the weight of the previous two components, of itaconic acid; drying the coated film; applying to the dried coated film a second coating comprising a copolymer obtained from 90–97% vinylidene chloride, 3–10% methyl acrylate and 1%, based on the weight of vinylidene chloride and methyl acrylate, of itaconic acid; and drying the twice-coated film.

12. A coated film as in claim 1 wherein the base film is polyethylene terephthalate.

13. A coated film as in claim 1 wherein the base film is polyethylene.

14. A process for preparing a packaging film which comprises coating a base film of thermoplastic polymeric material with a copolymer obtained from up to 50% vinylidene chloride, 40–90% alkyl acrylate wherein the alkyl group contains at least two carbon atoms and 10–30% acrylonitrile; drying the coated base film; applying to the dried coated film a second coating comprising a copolymer obtained from 80–97% vinylidene chloride and 3–20% of at least one other polymerizable mono-olefinic monomer copolymerizable therewith; and drying the twice-coated film.

15. A process as in claim 14 wherein the base film is polyethylene terephthalate.

16. A process as in claim 14 wherein the base film is polyethylene.

No references cited.

U. S. DEPARTMENT OF COMMERCE
PATENT OFFICE

CERTIFICATE OF CORRECTION

Patent No. 2,824,025            February 18, 1958

William Ernest McIntyre, Jr.

It is hereby certified that error appears in the printed specification of the above numbered patent requiring correction and that the said Letters Patent should read as corrected below.

Column 3, line 44, for "2.2 lbs." read --180 lbs.--; line 45, for "180 lbs." read --2.2 lbs.--; column 10, line 65, for "the paper" read --the proper--.

Signed and sealed this 27th day of May 1958.

(SEAL)
Attest:
KARL H. AXLINE

Attesting Officer

ROBERT C. WATSON
Commissioner of Patents